United States Patent [19]

Skaife

[11] Patent Number: 4,528,774
[45] Date of Patent: * Jul. 16, 1985

[54] PLANT AND SEED GROWING SYSTEM
[75] Inventor: William A. Skaife, Carlsbad, Calif.
[73] Assignee: Vivian A. Skaife, Cincinatti, Ohio
[*] Notice: The portion of the term of this patent subsequent to Jul. 22, 1997 has been disclaimed.
[21] Appl. No.: 399,006
[22] Filed: Jul. 16, 1982

Related U.S. Application Data

[63] Continuation-in-part of Ser. No. 169,673, Jul. 17, 1980, abandoned, which is a continuation of Ser. No. 863,086, Dec. 22, 1977, , which is a continuation of Ser. No. 704,190, Jul. 12, 1976, Pat. No. 4,100,699, which is a continuation-in-part of Ser. No. 693,637, Jun. 7, 1976, abandoned, which is a continuation of Ser. No. 577,863, May 15, 1975, Pat. No. 3,961,444.

[51] Int. Cl.³ ............................................. A01G 27/00
[52] U.S. Cl. ......................................... 47/81; 47/86
[58] Field of Search ..................................... 47/58–59, 47/747, 79–83, 85–86, 60–64, 56, 66

[56] References Cited

U.S. PATENT DOCUMENTS

| 195,094 | 9/1877 | Crowther | 47/79 |
| 1,912,914 | 6/1933 | O'Brien | 47/79 |
| 3,375,607 | 4/1968 | Melvold | 47/74 |
| 3,788,003 | 1/1974 | Creighton et al. | 47/56 |
| 3,842,537 | 10/1974 | Bishop | 47/74 |
| 3,883,989 | 5/1975 | Melvold | 47/73 |
| 3,961,444 | 6/1976 | Skaife | 47/73 |
| 4,133,141 | 1/1979 | Lee | 47/59 |

FOREIGN PATENT DOCUMENTS

| 245312 | 2/1966 | Austria | 47/63 |
| 760162 | 6/1967 | Canada | 47/74 |
| 1949473 | 4/1971 | Fed. Rep. of Germany | 47/64 |
| 1470367 | 12/1965 | France | 47/79 |
| 1480584 | 5/1966 | France | 47/64 |
| 566704 | 9/1975 | Switzerland | 47/59 |
| 299 | of 1885 | United Kingdom | 47/66 |
| 639454 | 6/1956 | United Kingdom | 47/64 |
| 1400450 | 7/1975 | United Kingdom | 47/81 |

OTHER PUBLICATIONS

"How NFT Compares," Supplement to the Grower, Oct. 7, 1976, pp. 17–21.
"The Break-Through of the Century," Supplement to the Grower, Feb. 14, 1976, pp. 33, 35, 37–40.
"Variation on NFT Theme," The Grower, Apr. 21, 1977, pp. 905–906.
"Soilless Agriculture," Washington Post Rotogravursection, Jan. 24, 1937, p. 3.
"Glasshouse: Top Grower's NFT Cucumber Crops Hit Mystery Trouble," The Grower, Jun. 17, 1976, pp. 1276–1277.
"Hardy Nursery Stock Production in Nutrient Film," The Grower, May 4, 1974, Two Pages.
"Improved Film Technique Speeds Growth," The Grower, Mar. 2, 1974, 2 pages reprint.
"Glasshouse: Kent Grower to go the Whole Hog with NFT Tomato Crops", The Grower, Aug. 19, 1976, pp. 393–394.

Primary Examiner—E. H. Eickholt
Attorney, Agent, or Firm—Zarley, McKee, Thomte, Voorhees & Sease

[57] ABSTRACT

An organic growing medium for plants or seeds placed in standing water having sustantially all the major and minor fertilizer elements is exposed to humid air over its substantial outer side surface thereby making air available to plant roots. The growing medium may be in a pot having porous sidewalls which allows air to be admitted into the pot or air openings may be formed in the pot sidewalls. The pot may further sit in a container wherein an air passageway is formed between the container and the pot to provide humid air around the growing medium. Alternately, the growing medium may be spaced from the container wall having air openings and an air chamber is formed between the growing medium and the container wall. A plant or seed may be placed in a growing medium centrally located of alternate air chambers and growing mediums formed by pairs of spaced apart walls having air openings therein allowing air to communicate to the growing medium and to allow the plant roots to grow from one growing medium into an air chamber and thence into the next growing medium. A further alternate embodiment includes a wall assembly in the growing medium including spaced apart walls forming an air chamber with a bottom channel wall for holding water or providing air and moisture to the adjacent plant roots through the perforated walls.

6 Claims, 26 Drawing Figures

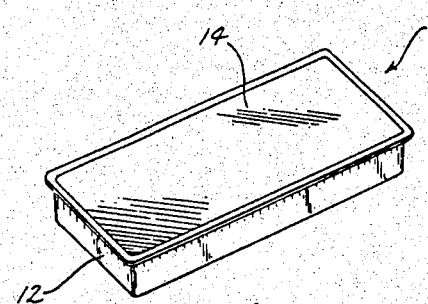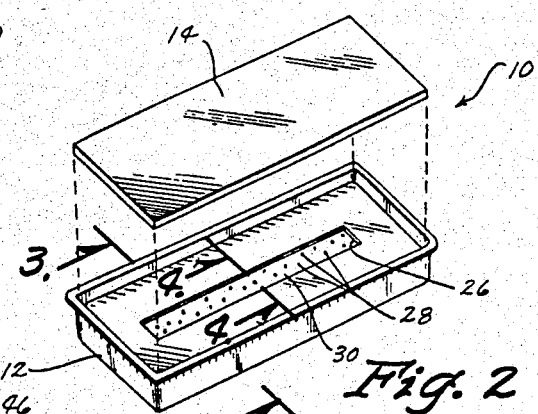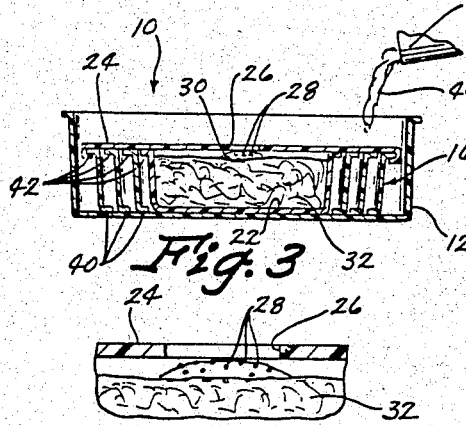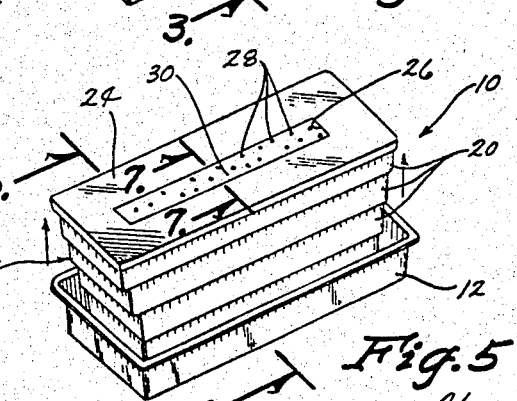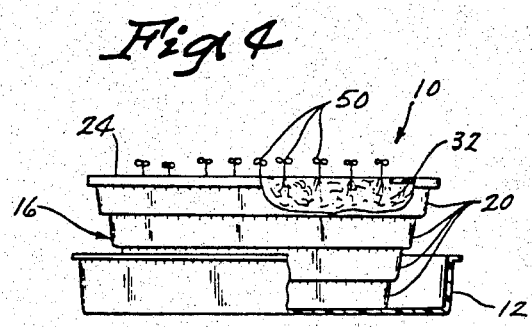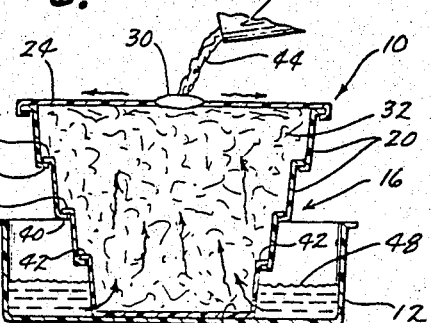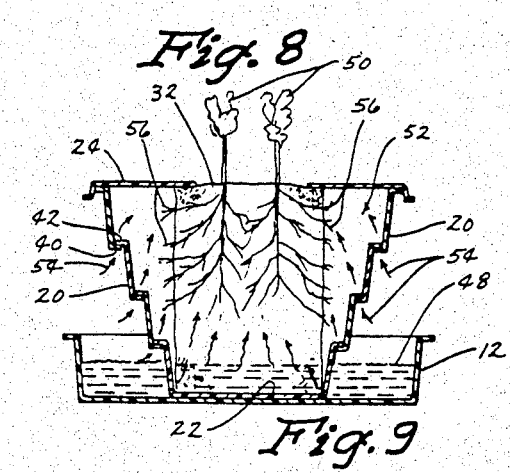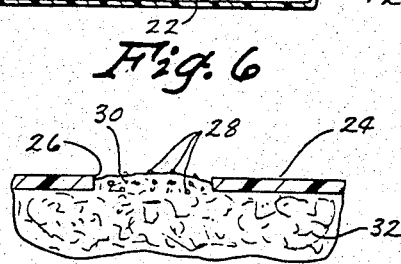

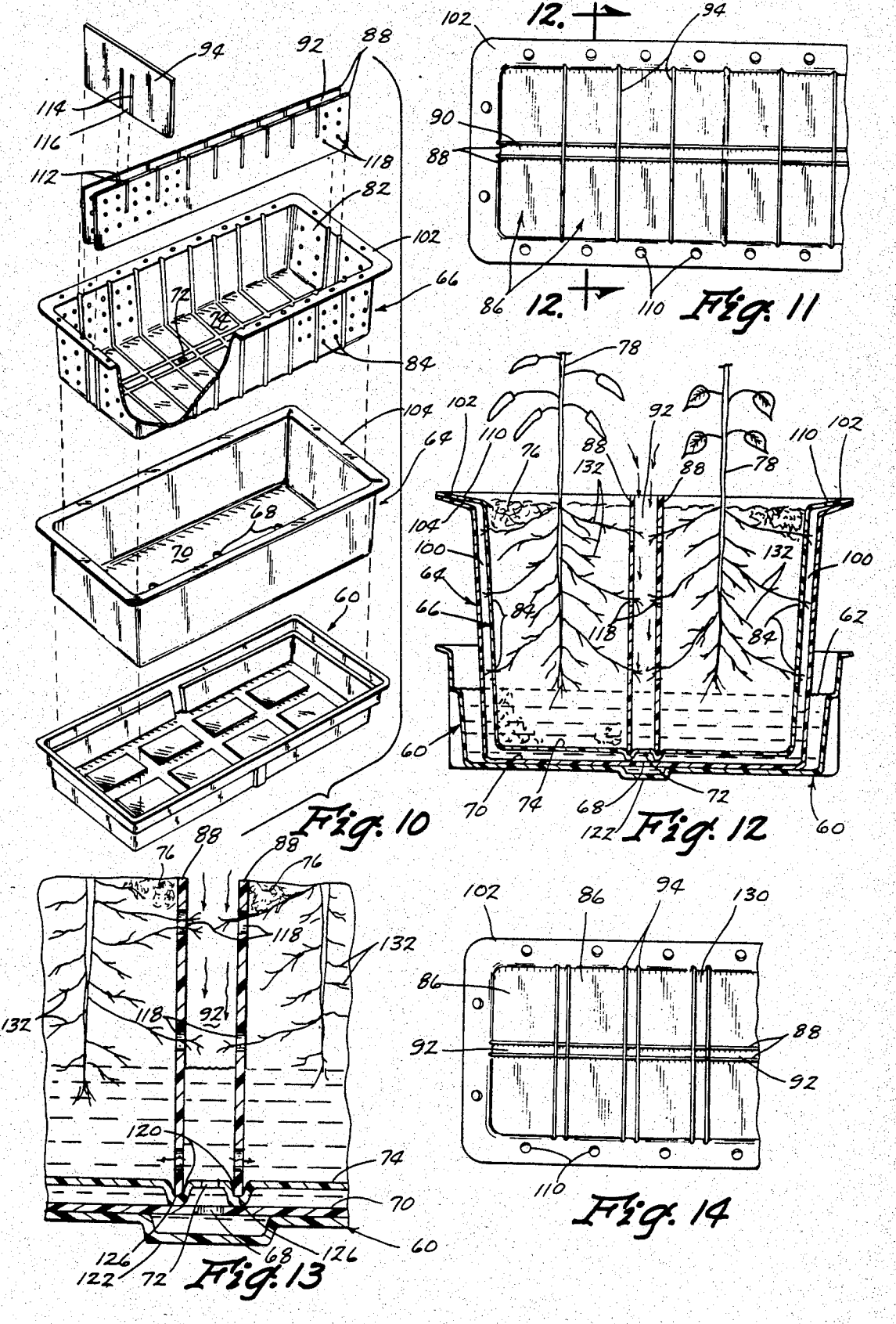

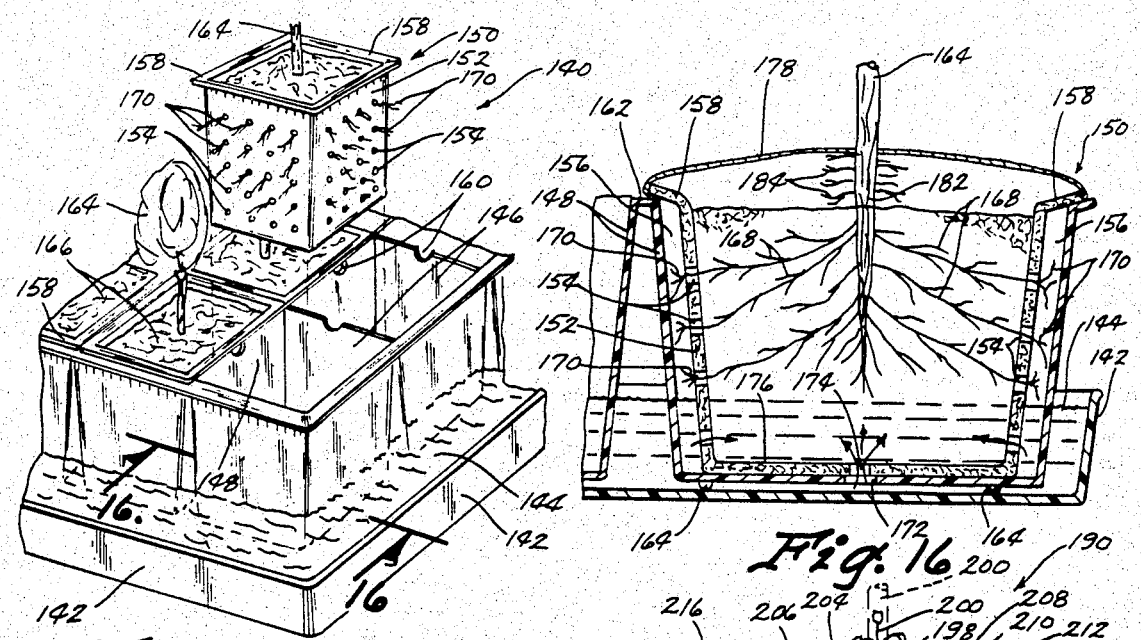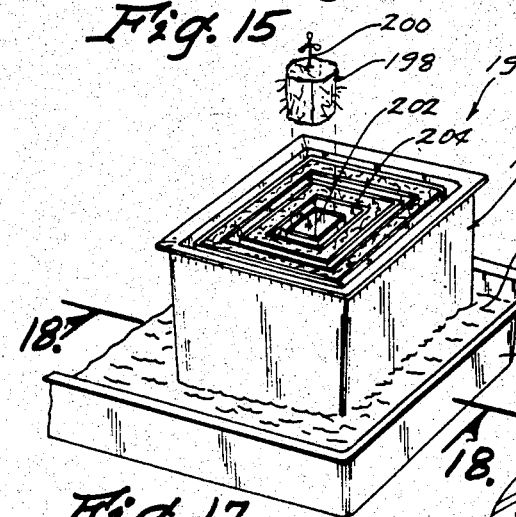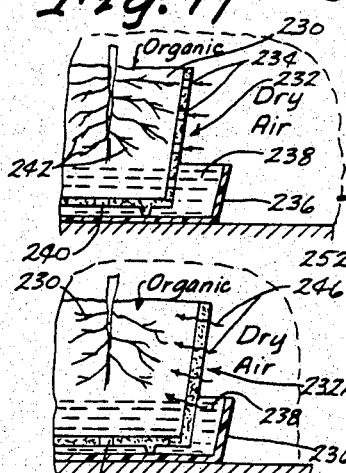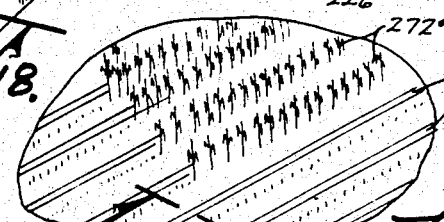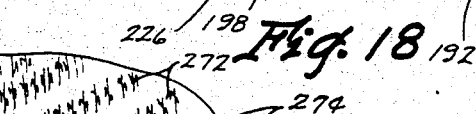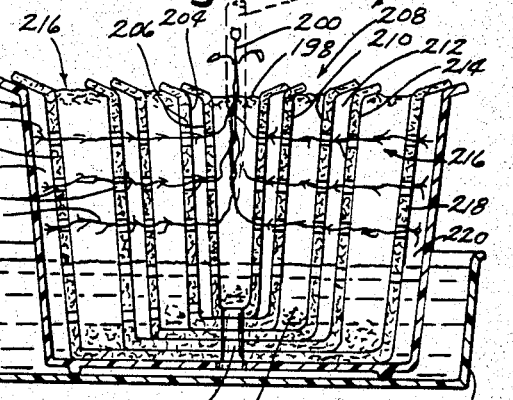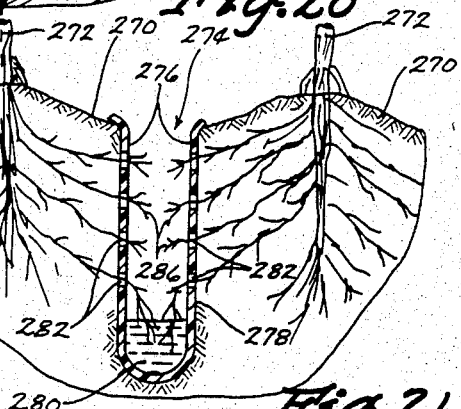

PLANT AND SEED GROWING SYSTEM

This is a continuation-in-part of application Ser. No. 169,673, July 17, 1980 now abandoned; which is a continuation application of application Ser. No. 863,086, Dec. 22, 1977; which is a continuation application of application Ser. No. 704,190, July 12, 1976, which issued as U.S. Pat. No. 4,100,699, July 18, 1978; which is a continuation-in-part application of application Ser. No. 693,637, June 7, 1976, now abandoned, which is a continuation of application Ser. No. 577,863, May 15, 1975, which issued as U.S. Pat. No. 3,961,444, June 8, 1976.

BACKGROUND OF THE INVENTION

All plant roots require supplies of water, oxygen, and nutrients in order to grow and to provide needed water and nutrients so the plant tops can grow also. Plant growth media generally hold considerable amounts of water strongly enough to prevent its being lost by normal drainage, but loosely enough for the plants to take it from the medium. Satisfactory media generally are not saturated with water. Either they do not absorb enough water to become saturated, or they promptly allow enough water to drain from them to permit air to enter the system and fill the larger pore spaces. The air provides the needed supply of oxygen and also provides an exit for the carbon dioxide produced as the plant roots respire. When too little air is present, or when the air has too little communication with the atmosphere outside the growth medium, the oxygen supply becomes depleted to the point of deficiency and/or the carbon dioxide level builds up to the point of toxicity. Plant nutrient supply can be had by the nutrients being dissolved in water. The accepted principle for fertilizing plants is the same as watering and that is in batches. The water/aerating cycles in batches lead to the enormous waste of water and inefficiency of growth but can be learned with experience.

The batch approach on fertilizing crops is quite different, more complex and difficult to master. The first problem is that each plant has a different fertilizer need as to the total amount of fertilizer and the percentage and amount of each of the 14 elements (nitrogen, phophorus, potassium, magnesium, sufate, sodium, chlorides, iron, zinc, copper, boran, maganese, calcium and molybdenum). In all conventional methods of growing, the fertilizer is either stored in the soil and diluted and made available when water is added; or it is in the water. It is extremely important in this method of fertilizing that the correct total amount of fertilizer and the correct percentage and amount of each of the 14 elements be provided that particular plant as to its specific needs at that moment.

Hundreds of different blends of fertilizer in different percentage amounts of the elements have been developed to meet the needs for each commercial plant with further modifications for their different stages of growth. The roots have been subjected to and are forced to take the complete mix and cannot select whatever amount of each element the plant needs in batch feeding.

To complicate things even further, the pH of the soil and/or water effects the ability of the roots to absorb the fertilizer in general and/or specific elements.

The challenge of every farmer and hydroponic grower then is to apply to the soil or medium the correct proportions and amounts of each of the 14 elements of fertilizer, in the correct total volume, with the pH corrected as to meet each crop's requirements. What they apply is literally force-fed to the roots.

The usual plant growth medium is soil. Plants grow well in most natural soils because natural forces usually provide a satisfactory balance of water and air through the growing season. A variety of forces are at work including physical, chemical, and biological agents. Some important physical actions such as shifting caused by wetting and drying and freezing and thawing help form soils into granular porous media. The chemical and biological agents help to bind the granules together and release the needed plant nutrients.

Water and air share the pore space in granular porous media such as soil. A condition called "field capacity" is reached when applied water percolates downward into dry soil and stops with the lower part of the soil or its underlying material still dry. Depending on pore size, the pore space of a soil at field capacity commonly contains about $\frac{1}{3}$ air and $\frac{2}{3}$ water by volume. The air is in the larger pores. The smaller pores hold water so tightly that it will not move downward under the combined pull of gravity and of the dry soil below. Plant roots are able to withdraw approximately half of the water held in soil at field capacity. This "available water" serves the plant needs until the next rain or irrigation replenishes the soil water.

Some soils contain or are underlain by a layer with low permeability. A water table is produced in such soils when water percolates through the soil too rapidly to escape. The soil is saturated a little above as well as below the water table. Roots, other than those of a few unique plants such as rice, normally will not penetrate the saturated zone.

The saturated zone above a water table is called the "capillary fringe." Its thickness can be calculated if the pore sizes are known. The relationship is: thickness $\times$ pore diameter $= 0.3$ cm$^2$. Pores 1 mm (0.1 cm) in diameter hold water to a height 3 cm above the water table; those 0.5 mm in diameter to 6 cm above the water table, etc. This phenomenon is called capillary rise and results from the natural attraction between soil particles and water.

Researchers have found that soil needs to have enough air space to replenish the oxygen supply by diffusion at minimum rates between 5 and $25 \times 10^{-8}$ g of $O_2$/cm$^2$ per minute. Soil must usually contain at least 10% air space to achieve the minimum oxygen diffusion rate. Consequently, plants may be "drowned out" even if the water table is several inches below the soil surface. Water-loving vegetation may grow with a water table at a depth of one foot, but most plants will not. Farmers go to great expense installing ditches and tile lines to lower water tables to acceptable levels.

When soil is placed in a pot and the pot is placed in standing water, the condition is basically the same as that in a field soil with a water table at a depth equal to the height of the pot soil surface above its standing water level. Consequently, pots with plants growing in them normally cannot be allowed to stand in water. In fact, soil in pots will usually absorb and hold too much water if it is placed in water for a few minutes and then removed. Too much water applied to the soil surface has the same effect. Water will drain from the bottom of the pot intervals that the user deems appropriate. Often the user feels the soil in the pot to determine when more water is needed. The patents of Crowther, Iken, Klemm, Ludvig, Mieritz, Puccio, Reynolds, and Sigg* all use this method. Their patents tend to concentrate on appearance, tidiness, and convenience, or on cheapness and ease of transplanting. Several attractive and clever pot designs are represented in this group but none of them provide automatic control of the water supply. Some of them provide air passages around and through the walls of an inner container, but none of them discuss the principles of capillary rise, pore size, and aeration pore space. None of them specify any minimum amount or size of pores in the growing medium. Most of them mention soil as a growing medium and the rest don't mention what the growing medium would be. Ordinary soil lacks the properties on which the present system is based.

The wick method is used by Brankovic, Claveau, Millet, and O'Brien*. The wick method permits the use of a water reservoir that holds water at all times—a feature shared by the present system. Water is supplied to the growing medium through the wicks at rates controlled largely by the number, size, and porosity of wicks used. The control is based on a limited rate of transfer and cannot be allowed to reach equilibrium because that would result in saturation of the soil or other common medium (none of these patents specify a medium that would avoid this problem). The wick system works automatically when it is properly adjusted to the water demand. The rate of water transfer has only a small degree of self adjustment. Larger changes in plant size or even marked changes in atmospheric temperature and humidity require changes in the wick system. Too little wick capacity would cause the plants to wilt and too much would cause inadequate aeration for the plant roots.
*infra.

The vapor transport system is used only in Crater's patent. It is doubted that it would have enough capacity to prevent plants from wilting. It shares some principles with the wick method in that both are based on a rate of transfer method of control rate than on an equilibrium state.

The present system differs from all of the prior art patents in being an automated system with a control method based on a near equilibrium in the air-water relationships. It allows for a constant water supply to be maintained instead of the intermittent watering based on user judgment employed in conventional flower pots. It works automatically for all seeds and plants and eliminates the need for adjustments in the size, number, and type of wicks required to adapt the wick system to varying conditions. It has a large water transport capacity that is more than adequate for any needs because water is permitted to enter freely into the base of the pot. The capillary capacity of the entire cross section of the growth medium is available to transport water upward from the resulting water table. Excess watering causing inadequate aeration cannot occur even with zero water use because an equilibrium condition is reached in which the amount of aeration pore space is still adequate for plant growth needs. It is this equilibrium condition resulting from a growth medium containing enough large pores to remain aerated at equilibrium that makes the present system work. None of the previous patents uses or mentions this basic feature, nor would any combination of the previous patents produce this characteristic.

French Patent No. 1,414,605—R. J. Millet

Millet presents a system for growing seedlings of tomatoes or other plants in small containers, probably for sale. The small containers can be transplanted into soil or into a growth medium in pots. Much of the emphasis is on the open-sided nature of the small containers that permits transplanting without damaging plant roots. A number (42 in his example) of small containers are housed in a larger more rigid container. A wick in the form of a blanke lines the larger container and an adjoining water compartment and contacts the base of each small container. Water transport is through and is controlled by the wick.

Millet's system is intended for commercial rather than decorative purposes and is to be used for producing seedlings only rather than for plants in all stages of growth. Water transport and control are dependent on the wick rather than on pore sizes in the growing medium. The growth medium is suggested to be soil or other solids medium and no mention is made of its pore sizes or other properties.

Italian Patent No. 255,727—Sziver Ludvig

Ludvig claims a self-watering flower pot with inner and outer walls spaced apart so that water can be introduced between them. The water reaches the soil medium through holes drilled in the bottom of the inner pot. The principle is identical to that of Crowther, though the pot design is different. He also claims a wire liner that facilitates transplanting the growing plants.

Ludvig makes no mention of maintaining a permanent water supply. Rather, he claims a pot that will automatically distribute the water when it is applied. The user must judge when and how much water to apply. He mentions a soil medium and does not qualify or define it in any way. Ordinary soil would become saturated if an unlimited water supply were maintained in the bottom of the pot. Air would be excluded and most plants would die.

German Patent No. 830,581—Hermann Mieritz

The diagrams indicate pots of various shapes with perforated bottoms extending downward into a water reservoir. The design is similar to that of Crowther and would have most of the same strengths and weaknesses of Crowther's design. Some of the drawings of Mieritz include provisions for watering from the bottom. With others it appears necessary to water from the top and permit any excess water to collect in the bottom and later to be reabsorbed in the manner suggested by Klemm.

The user of Mieritz's pots would have to regulate the water supply personally to prevent saturating the growing medium. There appears to be no special lining or other mechanism to facilitate the passage of air.

Italian Patent No. 455,065—Gaetano Puccio a Milano

Puccio claims either a double container or a double-walled container with a space for water between the inner and the outer container walls. This space is calculated to have a volume that serves to measure the proper amount of water to add at any one time, or alternatively, the water may be added in excess and the excess poured out again after a reasonable time. The water enters the growing medium through perforations in the sides and bottom of the pot.

The only growing medium mentioned is terra (soil). Water must be added at intervals according to the judgment of the user. A constant supply of water cannot be maintained because the soil would become saturated and air would be excluded, thus depriving the plant roots of oxygen. There is no mention of the principle of capillary rise or of how to maintain aeration pore space in the presence of a water table.

Swiss Patent No. 288,141—Sigg Limited

Sigg claims a double pot consisting of an ornamental oute pot and an inset plant pot with a hole in the bottom to receive water. Mention is also made of ventilation holes at a higher level. The emphasis is on decorative appearance, light weight, and general neatness.

Sigg says nothing at all about the growing medium, the amount and frequency of watering, or of the principles of supplying adequate water and air simultaneously for plant growth. All of these are left to the judgment of the user. Water would have to be added at intervals either to the top of the growing medium or, by lifting out the plant pot, to the bottom of the container. A constant water supply could not be maintained.

U.S. Pat. No. 954,440—H. Klemm

Klemm claims a inner and outer pot with an air and water chamber between and with air openings in the outer pot and air and water openings in the inner pot. Water is supplied to the earth in the inner pot and can drain into the space between the pots if there is an excess of water. The excess water can be reabsorbed later.

The user of Klemm's pot must regulate the water supply as there is no means provided for automatic regulation. An earth medium would be saturated before water would drain into the space provided between the pots unless the earth had cracks or other water-conveying passages. Even if there were cracks, there is nothing to prevent the medium from becoming saturated by reabsorbing the water. There is no mention of the principles controlling capillary action to maintain adequate aeration in the presence of an abundant water supply. An inexperienced user could easily drown plant roots. Contrasting plants could not be grown together in such a pot.

U.S. Pat. No. 1,912,914—D. W. O'Brien

O'Brien claims a replaceable soil container of compressed Sphagnum moss or other organic material that will transfer water to soil or other growing medium. These containers are housed in water-retaining outer containers and water is transferred through wicks to the soil containers and thence to the growing medium. He explains that different kinds of plants can be grown by varying the size and type of wick and thus regulating the rate of water transfer.

O'Brien indicates that the type of growing medium and therefore the pore siz distribution is immaterial. He controls the water supply through his wick system. The wicks must be properly sized to meet the needs of the plants to be grown and the growing conditions. Temperature changes and even changing size as the plants grow could change the size or number of wicks needed. Contrasting plants could not be grown in the same soil container. His patent is basically a container type and a wick system unrelated to the present system. He makes no mention of the principles involved in having the growing medium itself control the water and air supply.

U.S. Pat. No. 195,094—Joshua Crowther

Crowther claims a patent on a perforated conical or pyramidal false bottom to be placed in a pot having access holes to introduce water into the space thus formed in the bottom of the pot. His explanation indicates that water introduced into the pot will be distributed through a dirt medium and permit both air and water to circulate freely in the dirt around the roots of the plant.

Crowther does not claim that his invention will automatically control the water supply. With a dirt medium it would not do so because the medium would absorb water until it was saturated. Thus Crowther's pot, like other common pots, requires the user to control the water supply and will result in the roots suffocating if excess water is supplied. He makes no mention of critical pore sizes in the growing medium, of how much dirt might be saturated with water, or of the principles involved in maintaining aeration pore space when an unlimited water supply is present.

U.S. Pat. No. 4,083,146—Obrad Brankovi

Brankovi claims a container holding a large water supply at a regulated level so that a wick in the bottom of a pot can transfer water to the pot. The water control system is very sophisticated and would indeed maintain a constant water level. The action depends on a partial vacuum being formed above the water chamber, though this is not explained.

The nature of the growing medium is not mentioned in the Brankovi patent nor is there any suggestion that the pore sizes in the growing medium would be important. The water supply is regulated by a wick system that is based on totally different principles than the present system of this application. The wick is a key element but there are no details as to its nature. There is no indication that plants of contrasting nature could be grown together. Rather, a modification is proposed for growing certain plants that require more water than others.

U.S. Pat. No. 3,058,263—A. O. Reynolds

Reynolds involves a complex pot designed especially to maintain the high humidity needed for plants such as African Violets. He controls the water supply by visually noting how long it takes for the water to disappear from the tray into which it is poured. From there the water passes into a porous absorbant material which contacts the bottom of the growing medium container. The capillary properties of this container serve not only to convey water to the medium but also to meter the rate of water transfer.

Reynolds makes no claim relative to maintaining adequate aeration in the presence of a permanent abundant water supply. He concentrates on the needs of African Violets and shows only passing interest in other plants. He makes no claim for being able to grow all kinds of plants alone or in combination. There is no consideration of the principle of using a wide range of pore sizes to maintain satisfactory air and water relations in the growing medium.

U.S. Pat. No. 576,850—H. Iken

Iken teaches a double-walled pot made of sheet metal and having fine perforations in the inner receptacle to substitute for the porosity of the common clay pot. He says that his pot is cheaper and just as good as an earthenware or wood pot and is easier to decorate.

Iken makes no mention of the properties of the growing medium required to permit automatic supply of water and air. He does not mention how water would be supplied but the comparison to earthenware pots suggests that water would be added in the common way of simply pouring some on the surface of the growing medium. The timing and amount would have to be regulated by the user in a manner that would prevent saturation of the growing medium.

U.S. Pat. No. 195,580—C. H. Crater

Crater teaches a perforated flower pot contained in an exterior casing and covered with adjustable shields to control water loss from the growing medium. The exterior casing can be large enough to hold several gallons of water that will gradually evaporate and provide water to the growing medium through vapor transport.

The practicali of Crater's system is questioned. It is doubted that the vapor transport system would provide water fast enough to meet the needs of most growing plants. He tries to reduce the water requirement by sealing the space between the two containers and by his adjustable cover shield. He can thus limit evaporation losses but the transpiration requirements of the plants would be unchanged and would probably exceed the rate of vapor transport. Furthermore, if he seals the system enough to prevent evaporation losses, he also inhibits aeration and thus increases the likelihood of the plant roots suffering from oxygen starvation and carbon dioxide toxicity. The system differs from the system of this invention in using vapor transport rather than pore size to control water transfer and in interfering with rather than facilitating adequate aeration.

French Patent No. 1,470,367—M. Jean Claveau

Claveau claims a humidifying flower pot consisting of a perforated inner soil container and an outside casing that will hold a reserve of water with air above it. Water is transferred to the soil mass in the inner pot by capillary action through the soil in a small downward projection of the inner container. Claveau explains that this system maintains a suitable moisture content in the soil mass because only a small portion of the soil volume is immersed. He further explains that air flows freely around the inner container and provides good soil aeration.

Claveau's pot uses the small downward protrustion of soil as a wick to limit the rate at which water would be transferred to the soil by capillary action. This system will work only when the transfer capacity of the soil wick is equal to the evaporation plus transpiration requirements of the soil and plant at the top of the pot. The equilibrium condition would be to saturate the soil to the full height of its normal capillary rise. This condition would occur if there were no water loss from the top and might be approached when sprouting seeds or growing small plants. As the plants grow larger, and especially in a warm dry environment, the water demand could exceed the wick capacity and cause the plants to wilt. Claveau makes no mention of the principles of using large pores in the growing medium to prevent saturation and maintain adequate aeration in the presence of a permanent water supply.

SUMMARY OF THE INVENTION

The growing system of this invention provides an ideal environment for all plants to take not only water and air, but all of the fertilizer elements, in the correct proportions of each, the plant needs for optimum growth, without regard to the pH of the medium or water. Along with the water and air, the roots of all plants will pick up fertilizer in the correct proportions for optimum plant growth from a fertilizer blend by the addition of one basic fertilizer containing all 14 elements into the water supply which is in constant contact with the aerated wicking medium. Those fertilizer elements include among others, nitrogen, phophorus, potash, iron, manganese, boran, and zinc. This combination of air, water and fertilizer automatically serves the needs of plants ranging from cacti to water-loving succulents permitting any desired plant or combination of plants to be grown. No adjustment of materials or techniques is needed other than to provide containers of adequate size for the root systems.

The growth medium used is coarse enough to reduce the capillary fringe to a thickness that leaves 10% of the pore space is in pores with diameter larger than 1.5 mm. Such a medium contains adequate air for root growth at any height more than 2 cm above the water level that is normally maintained near the bottom of the container. Other growth media can be used but they must provide similar amounts of large pore space for air and small pore spaces or the water. Ordinary soils are not suitable in pots or other containers kept in standing water less than two feet below the soil surface because they do not contain enough stable large pore space.

The container used to hold the growth medium provides communication between the air in the pore space of the medium and the atmosphere outside in order to provide the needed diffusion rates for ingress of oxygen and egress of carbon dioxide. Several designs are possible including holes or joints in the sides of the container, double-walled containers with porous inner walls, removable porous liners in the container, and porous partitions or other inserts within the medium. Thus the principle object of this invention is to provide a growing system which includes a miniturized, constant and stable environment of water, air and a single fertilizer blend containing all the major and minor elements; operated by the natural forces capillary action and air pressure; in which the roots of the plants grow into predonminately feeder/hair roots (humidity roots); and efficiently select the amounts of water, air and each element of fertilizer by cafeteria feeding needed to support maximum growth and productivity; under all environmental conditions and all stages of plant development without human control and without pH adjustments.

DESCRIPTION OF THE DRAWINGS

FIG. 1 is a perspective view of the collapsed container containing compressed peat moss.

FIG. 2 is an exploded view similar to FIG. 1 but showing the shipping cover removed.

FIG. 3 is a cross-sectional view taken along line 3—3 in FIG. 2.

FIG. 4 is an enlarged fragmentary view taken along line 4—4 in FIG. 2.

FIG. 5 is a perspective view showing the container in its expanded condition.

FIG. 6 is a cross-sectional view taken along line 6—6 in FIG. 5 and showing water being applied to the peat moss and soluble wax containing the seeds.

FIG. 7 is a cross-sectional view taken along line 7—7 in FIG. 6.

FIG. 8 is a fragmentary view of the container showing plants that have grown from the seeds.

FIG. 9 is a cross-sectional view similar to FIG. 6 but showing the plant after root growth has occurred wherein the roots are receiving oxygen from the air in the chambers between the container sidewalls and the growing medium.

FIG. 10 is an exploded fragmentary perspective view of the container having a pot assembly with apertured sidewalls and transversely extending walls defining individual plant pots and air chambers.

FIG. 11 is a fragmentary top plan view thereof.

FIG. 12 is a cross-sectional view taken along line 12—12 in FIG. 11.

FIG. 13 is an enlarged cross-sectional view similar to FIG. 12.

FIG. 14 is a modified embodiment of that shown in FIGS. 10-13 wherein an air chamber is provided on all sides of the individual pots by the transversely extending walls being in pairs and spaced apart.

FIG. 15 is an alternate embodiment of this invention wherein a container includes a plurality of chambers which receive individual pots having air holes in the sidewalls for transmission of air from an air chamber to the growing medium and for the roots to grow into the air chamber.

FIG. 16 is a cross-sectional view taken along line 16—16 in FIG. 15.

FIG. 17 is a further alternate embodiment wherein a plurality of concentric alternating growing mediums and air chambers are provided for plants as they grow in size such that their roots are always in communication with air.

FIG. 18 is a cross-sectional view taken along line 18—18 in FIG. 17.

FIG. 19 is a side elevation view of a hothouse functioning as a humid air chamber around an aerated potted plant.

FIG. 20 is a fragmentary perspective view of a field growing medium having spaced apart air chambers formed by channel walls with water being held in the bottom of the air chamber for providing air and moisture to the plant roots.

FIG. 21 is a cross-section view taken along line 21—21 in FIG. 20.

FIG. 22 is a cross-sectional elevational view of a plant in an aerated container being continuously watered and exposed to dry air.

FIG. 23 is a view similar to FIG. 22 but showing the container of a naturally porous material having air transmission capability.

DESCRIPTION OF THE PREFERRED EMBODIMENT

Figure 24:
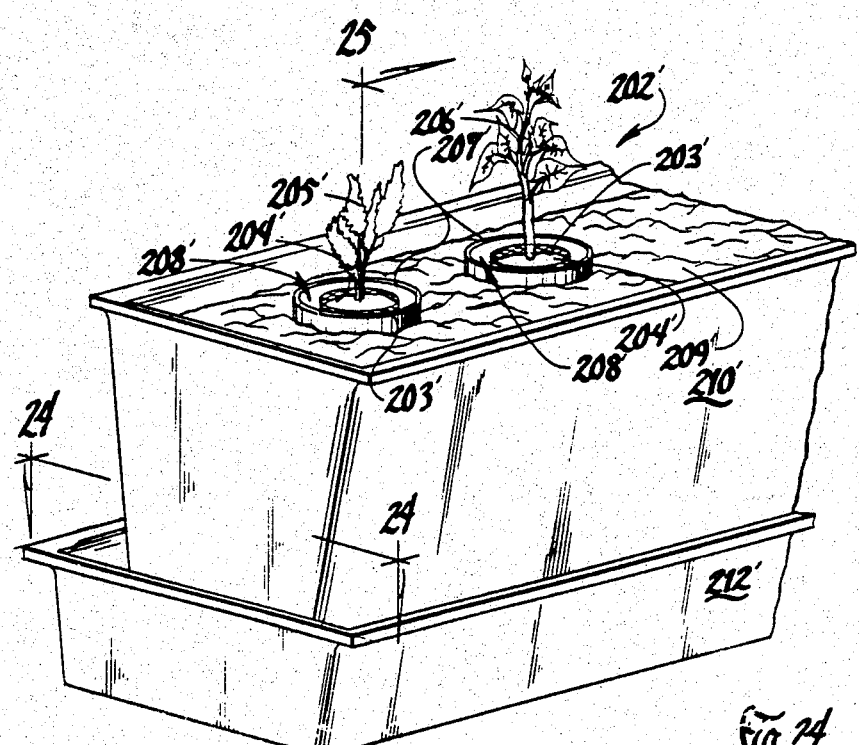
FIG. 24 is a fragmentary perspective view of a modification of the invention as shown in FIGS. 17-18.

The flower box of FIGS. 1-8 is referred to generally in FIG. 1 by the reference numeral 10 and includes a container 12 rectangular in shape open at the top except for a removable shipping cover 14. A variable size container 16 is positioned in the box 12 and includes a plurality of the telescopically interconnected nexting sections 20 with the bottom section having a bottom wall 22. The top section is substantially closed by a cover 24 having an elongated opening 2 along the longitudinal center line of the container 16 for exposing seeds 28 embedded in a layer of water soluble wax 30 on top of compressed peat moss 32. It is seem in FIG. 3 that the compressed peat moss 32 occupies in the collapsible container 16 only a portion of the total space available in the container 16 when compared with the expanded size of the container.

Each of the telescopic sections 20 include bottom peripheral inwardly extending flanges 40 for engagement with outwardly extending peripheral flanges 42 on the upper end of the next lower section 20.

The flower box 10 is assembled by first placing the compressed peat moss in the telescopic container 16 and applying seeds 28 to the top of the peat moss followed by a heated coating of water soluble wax 30 for securing the seeds 28 to the peat moss during shipment and the like. The cover 24 is then placed on the top telescopic sections 20 followed by the shipping cover 14. Upon arrival at the destination and in preparation for use the shipping cover 14 is removed and discarded and as seen in FIG. 3, water 44 is applied from a faucet or container 46 to the wax 30 which in turn dissolves it and allows it to wash away leaving the seeds 28 which can now germinate and begin growing in the moistened and expanded peat moss 32. The expansion of the peat moss causes the telescopic section 20 to expand to the condition of FIG. 6. Future watering is accomplished by providing water 48 in the watering tray 12. As seen in FIG. 8, plants 50 are produced by the seeds 28 and extend upwardly through the opening 26 in the cover 24.

It is appreciated that the flower box of this invention involves fascinating qualities that are appreciated by the user when water is applied to the opening 26 in the cover 24. The expandable container 16 begins rising before the user's eye for no apparent reason followed by gradual disappearance of the wax 30 which as indicated leaves the seeds 28. The drama continues days later as the plants 50 begin to appear.

In FIG. 9 greater detail of the inside of the container is shown wherein an air chamber 52 is seen between the expanded peat moss 32 and the sidewalls of the telescopically interconnected nesting sections 20. In reality the compressed peat moss when expanded by the application of water expands vertically and not laterally significantly thus forming an air chamber 52 since the walls flare outwardly from the base upwardly. The arrows 54 indicate air entering the chamber 52 through the joint interconnecting the telescopic sections 20. The air in the chamber 52 is humid due to the moist peat 32 in continuous contact with the standing water 48. Thus the roots 56 of the plants 50 are exposed to air and moisture in the chamber 52. The air contains oxygen upon which the plant 50 will feed.

An alternate embodiment of this invention is shown in FIGS. 10-13 with a further modified version being shown in FIG. 14. A watering tray 60 containing standing water 62 receives a rectangular in shape container 64 which in turn receives a pot assembly 66. Bottom watering holes 68 are provided in the bottom wall 70 of the container 64 for transmission of water 62 through the watering holes 72 in the bottom wall 74 of the pot assembly 66 to the growing medium 76 containing a plant 78. The exterior side and end walls 80 and 82, respectively, of the pot assembly enclosure 66 include air holes 84 throughout their substantial area. Individual pots 86 are formed by divider walls 88 in parallel spaced relationship and define an air chamber 92 therebetween. Individual pots further comprise the transversely extending walls 94 which as seen in FIGS. 10 and 11 are not apertured since air supplied from the chamber 90 on one side of the growing medium 76 is sufficient when taken along with the air supplied from the air chamber 100 between the pot assembly wall and the container wall, as seen in FIG. 12. The pot assembly is sufficiently smaller than the container 64 to provide the air chamber 100 on all sides of the pot assembly. Mating top outwardly extending flanges 102 and 104 are provided on the pot assembly enclosure 66 and the container 64, respectively. Air holes 108 and 110 are provided in the flanges 102 and 104, respectively, for communication between the air chamber 100 and the atmosphere.

The air chamber 92 between the longitudinally extending walls 88 is maintained by the transversely extending walls 94 which interlock through interlocking serrations 112 and 114. The serrations 114 are on opposite sides of any spacer element 116 positioned between the walls 88 and in the chamber 92. The walls 88 are also provided with air openings 118 for communication between the air chamber 92 and the growing medium 76. As seen in FIG. 13, the lower ends of the walls 88 are also received in longitudinally extending grooves 120 to maintain the lower ends of the walls in spaced relationship. The water 62 in the watering tray 60 is maintained in a trough 122 below the apertures 68 in the container bottom wall 70 and also the watering hole 72 in the bottom wall 74 of the pot assembly enclosure 66. To prevent a seal occurring between the bottom wall 74 and 70, the grooves 120 form downwardly extending spacer shoulders 126 to maintain the two bottom walls in spaced relationship, as seen in FIGS. 12 and 13.

Further air may be provided to the individual pots 86 by a pair of walls 94 being provided extending transversely to the walls 88, as seen in FIG. 14, and thereby defining an additional chamber 130 in communication with the adjacent growing mediums 76. It is seen that the plants 78 include roots 132 which grow outwardly in search of air and moisture and nutrients supplied in the air and actually grow through the openings 118 and 84 where they thrive in the chair chambers 92 and 130 formed by the walls 88 and 94, respectively, along with the air chamber 100 extending around the outside of the pots 86.

A further alternate embodiment is illustrated in FIGS. 15 and 16 and is referred to generally by the reference numeral 140 and includes a watering tray 142 containing water 144 in communication with a plurality of chambers 146 formed by walls 148. The chambers 146 receive individual pots 150 having sidewalls 152 including air openings 154. The pots 150 are smaller than the chambers 146 and thereby form an air chamber 156 around the pots 150. An outwardly extending peripheral flange 158 on the pots 150 rest on the upper edges of the walls 148 to restrict air entering the air chamber 156. Air openings 160 are provided for the admission of air into the chamber 156. The chamber walls 148 are linked together by bridging horizontal portion 162, as seen in FIG. 16. Support and spacer legs 164 maintain the bottoms of the chambers 146 above the bottom wall of the watering tray 142, as seen in FIG. 16.

A plant 164 is provided in the organic growing medium 166 and includes roots 168 in the growing medium which extend outwardly in search of the air in the chamber 156, as seen by the root in 170 in the chamber 156. Water from the tray 142 rises in the chamber 156 to the level of the water in the tray and thus maintains the air humid. Water also enters the chamber through bottom watering holes 172 which are also in communication with watering hole 174 in the pot bottom wall 176.

In FIG. 16 a cover 178 is provided over the top of the pot 150 and engages the flanges 158. Through use of this top and additional humid air chamber 180 is provided around a plant stock portion 182 which due to the optimum growing conditions produces roots 184 above the growing medium 166. This shows the desirability of maintaining humid air within reach of the plant root structure since it encourages root growth and thus plant growth.

In FIGS. 17 and 18 a further embodiment is shown and it is referred to generally by the reference numeral 190 and includes a watering tray 192 containing water 194. An outer plant container 196 is provided which is generally square in shape.

An organic growing medium ball 198 containing a plant 200 is positioned in the center of the container 196 in a first chamber 202. A second chamber 204 is defined by a pair of concentric spaced apart walls 206 and this chamber functions as an air supply chamber. Next, a growing medium chamber 208 is defined by spaced apart walls 206 and 210 and contains the organic growing medium material 198. Again moving concentrically outwardly, another air chamber 21 is defined by spaced apart walls 210 and 214. Lastly, a growing medium chamber 216 is defined by the wall 214 and a wall 218 and an air chamber 220 is provided between the wall 218 and the walls of the container 196. Each of the walls, it is seen, include apertures 22 over their substantial area for transmission of humid air as well as to allow the roots 224 to grow freely outwardly in the growing mediums and air chambers in the pursuit of moist air and nourishment. An aligned series of openings 226 in the center of the series of wall containers transmit water 194 from the tray 192 into each of the chambers to provide moist growing mediums and humid air chambers. Thus it is seen that as the plant grows from a small plant, as seen by the solid lines in FIG. 18, to a large plant, as seen by the dash lines, the root structure is always within reach of fresh moist air. The plant 200 may be referred to as "leapfrogging" from one chamber to the next outwardly concentric chamber. This structure allows the plant to never have to be transplanted as it can be started out as a seed or a very small plant in a very large container and continue to grow in this container to a large size plant.

Figure 25:
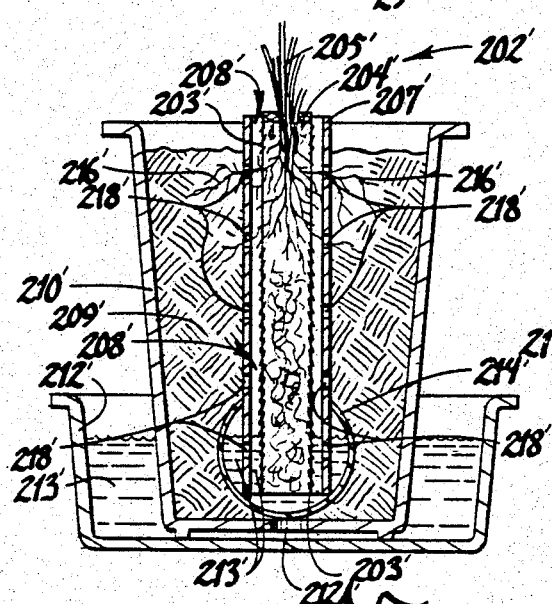
FIG. 25 is a cross-sectional view taken along line 25—25 in FIG. 24.
Figure 26:
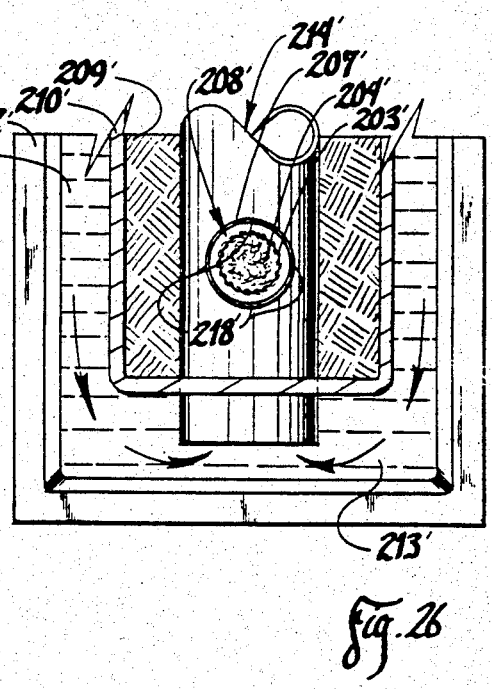
FIG. 26 is a cross-sectional view taken along line 24—24 in FIG. 24.

FIGS. 24–26 show a modified "leapfrogging" growing system particularly well suited for growing vegetables of all kinds at the same time in side-by-side relation. This invention is generally referred to by the reference number 202' and includes a series of cylindrical net stockings 203' filled with growing medium 204' for growing plants 205' and 206'. An outer container tube 207' is spaced sufficiently to provide an annular air chamber 208' around the periphery of the growing medium 204'.

A larger mass of growing medium 209' is provided in a container 210' positioned in a watering tray 212' containing water 213'.

The net stockings 203' and tubes 207' extend into a horizontally extending watering pipe 214'. The pipe 214' and tray 212' may receive water from a common source or from separate sources. As shown the water in both the pipe 214' and tray 212' is the same. The use of separate watering sources would include making the pipe 214' a continuous pipe rather than terminating it within the container 210' as seen in FIG. 26. As shown, the water in the tray 212' communicates through an opening 212A with the bottom of the container 210' which in turn communicates with the inside of the pipe 214' as indicated by the arrows in FIG. 26.

It is seen in operation that the plant roots 216' grow out of the growing medium 204' through the apertures in the net stocking 203' into the growing air chamber 208' and then through apertures 218' in the tube 207' into the larger mass of growing medium 209'. Both growing mediums 204' and 209' are maintained moist at all times by direct contact with separate or common watering sources.

Optimum plant grown can perhaps be best explained in terms of root activity. The roots in the stocking 203' are referred to as humidity roots and grow into the humidified air space 208' between the stocking and the vertical tube 207'. The vertical tubes 207' are surrounded by the growing medium 209'. Both the medium 204' in the stocking 203' and the medium 209' surrounding the vertical tubes 207' must be uniformly wet as provided by standing in water at all times for maximum growth to occur in practice. The humidity roots become humidity hair roots in the humidified air space between the stocking and the vertical tubes in the humidified air space between the stocking and the vertical tubes. They grow through the holes 218' in the vertical tubes. The holes in the vertical tubes also provide air to the mass of medium 209'. The humidity hair roots change back into humidity roots in the medium surrounding the vertical tubes. The humidified air between the stocking and the vertical tubes is used as a vehicle through which a root can grow from one medium into another without the two mediums touching. This is important so that it is unnecessary to plant or harvest plants in the soil or rework the soil between crops.

Once the roots have leapfrogged from the stocking and air space into the mass of medium surrounding the vertical tubes, the following benefits are realized:

1. A larger mass of medium to support the roots of very large plants is provided;
2. The growth and vitality of the plant is not restricted by salt build up in the stocking;
3. The food items grown have better flavor and nutrition due to salt (residue, fertilizer) in the medium in the stocking not adversely affecting plant growth due to continued plant growth being supported by leapfrog roots in mass of the larger medium which has less salt build up.
4. It is possible to utilize two different methods of fertilization for the same plant by watering the medium in the stocking from one source of fertilized water and the mass of medium from another source having a different fertilizer.
5. Use can be made of worms, humus, nitrogen fixation plants and other forms of natural fertilizers in the mass of the medium for organic and less expensive fertilizers support.

As previously indicated, one of the concepts of this invention is that continuous watering of plants may be practiced if air is made available to the growing medium and plant roots. While the air is preferably humid air since the plant will grow more aggressively it may be dry air as indicated in FIG. 22. The growing medium 230' is of organic material in a pot 232' having air openings 234' substantially uniformly distributed over the sidewalls of the pot. No humid air chamber as such is provided in this arrangement. Water 236' from a watering tray 238' is supplied through bottom watering holes 240' in the pot 232'. It has been found that the roots 242' will grow outwardly to the opening 234' in the container wall but due to the air being dry will not significantly grow through the container wall openings 234'. Continuous watering may be practiced, however.

In FIG. 23 the same arrangement is shown but the container 232A is made of a material such as peat which has substantial porosity to allow air, indicated by the arrows 246, to pass through the walls. Other plastic materials that are sufficiently porous for air transmission may be used.

In FIG. 19 a hothouse 250 is shown which includes a humide air chamber 252 surrounding a plant 254 in a pot 256 having air apertures 258 for transmission of the humid air to the growing medium and also to allow the roots of the plant to grow out of the pot in search of the oxygen in the moist air. A continuous watering tray 260 is provided for the pot 256. This arrangement would be used in commercial production of plants. It is understood that the air would transmit through the exterior walls of the hothouse 250.

The organic growing medium used in the various embodiments of this invention is preferably compressed peat moss obtained from Hasselfors Garden, Hasselfors, Sweden.

Lastly, the concepts of this invention are illustrated in field application in FIGS. 20 and 21 wherein the growing medium is soil 270 in which plants 272 are growing. Between the rows of plants 272 are humid air chambers 274 provided by spaced apart walls 276 having bottom channel portion 278 for holding water 280. The walls 276 above the water 280 include air openings 282 for admission of air from the chamber 274 into the growing medium soil 270 and for the roots 286 to grow outwardly in search of air and moisture. Use of the concepts of this invention in this growing application minimized the wasting of water since it is held adjacent the plant roots and the roots use as much as they need. A water source (not shown) may be connected to the air and water chambers 274.

A preferred fertilizer blend is available from Peters Fertilizer Products, W. R. Grace and Co., Allentown, Pa. Their blend Hydro-sol is prepared in the following matter:

Step One. Dissolve 130 ounces or about 8 pounds of this material in 1000 gallons to obtain the following concentrations:

| | | PPM |
|---|---|---|
| Nitrogen (all Nitrate Nitrogen) Total N | | 50.0 |
| Phosphorus | P | 48.0 |
| Potassium | K | 210.0 |
| Magnesium | Mg | 30.0 |
| Sulfates | $SO_4$ | 117.0 |
| Iron | Fe | 3.000 |
| Manganese | Mn | 0.500 |
| Zinc | Zn | 0.150 |
| Copper | Cu | 0.050 |
| Boron | B | 0.500 |
| Molybdenum | Mo | 0.100 |
| Chlorides | Cl | 0.040 |

| | | |
|---|---|---|
| Sodium | Na | 3.619 |

Step Two: After the Hydro-Sol and any Epsom Salts needed have been dissolved in the tank, proceed as follows:
Dissolve 86 ounces of Calcium Nitrate in the same 1000 gallons. Total nutrient concentration will then be:

| | |
|---|---|
| Nitrogen - 150 PPM N | Calcium - 129 PPM Ca |

It is thus apparent that the energy, material and labor saves following the growing system of this invention compared to conventional growing systems, are monumental. The water and fertilizer savings are particularly significant using the approach of this invention verses the storage/batch approach.

Although in the past it has been standard practice to provide specific fertilizers for specific plants and to adjust the pH accordingly it is apparent that it is now possible to use a single blend of fertilizer containing all 14 elements for growing all plants and produce ideal growth and superior poundage from all vegetable plants which can only be duplicated with specific fertilization and pH adjustments by experts on each specific crop. The system of this invention makes it possible to conclude that the pH of the medium and the water (within normal ranges) has absolutely no adverse affect on the efficiency of the roots to select what they need from the environment. The leapfrog concept eliminates the salt build up problem ordinarily experienced which would make the roots inoperable after a period of time when the growing medium in the stocking alone is relied upon solely.

I claim:

1. A system for growing all seeds and plants or any combination thereof comprising,
    first and second growing mediums with said second growing medium having a larger mass than first growing medium,
    container means for maintaining said first and second growing mediums in spaced relationship to provide an air chamber therebetween,
    a plant in said first growing medium having roots adapted to grow into said chamber and into said second growing medium,
    said first and second growing mediums each having enough small pores in communication with a water supply from below to automatically supply all the water needs for seed and plant growth and,
    enough large pores to limit the saturation capillary fringe to a small fraction of the growing medium and to provide adequate aeration pore space for seed and plant growth and,
    the growing mediums contained in such a way as to provide for continuous ready entry of oxygen into and escape of carbon dioxide from the growing mediums.

2. The system of claim 1 wherein said first growing medium is cylindrical in shape and said container means includes an apertured stocking for holding said first medium in spaced relation to said second medium.

3. The system of claim 2 wherein said stocking is disposed in an apertured cylindrical tube whereby said air chamber is further defined as being between said stocking and said tube.

4. The system of claim 4 wherein said water supply for each growing medium includes substantially all the major and minor fertilizer elements.

5. The system of claim 4 wherein separate water systems are provided for each growing medium.

6. The system of claim 4 wherein said second growing medium includes a plurality of first growing mediums disposed in stockings held in tubes for growing plants in spaced apart side by side relationship.

* * * * *

UNITED STATES PATENT AND TRADEMARK OFFICE
CERTIFICATE OF CORRECTION

PATENT NO. : 4,528,774

DATED : July 16, 1985

INVENTOR(S) : William A. Skaife

It is certified that error appears in the above-identified patent and that said Letters Patent is hereby corrected as shown below:

On the title page item [63], line 1, after "Ser. No." insert -- 171,499, July 23, 1980, which issued as Patent No. 4,397,114, August 9, 1983; which is a continuation-in-part of Ser. No. --.

Signed and Sealed this

Nineteenth Day of November 1985

[SEAL]

Attest:

DONALD J. QUIGG

Attesting Officer

Commissioner of Patents and Trademarks